Figure 1:
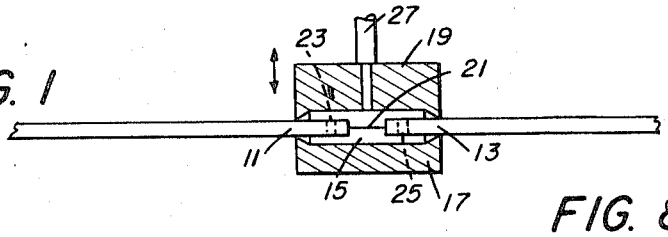
Figure 2:
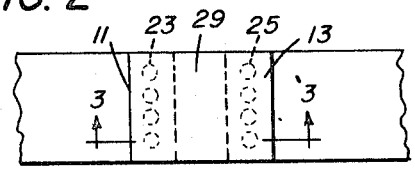
Figure 3:
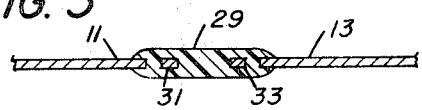
Figure 4:
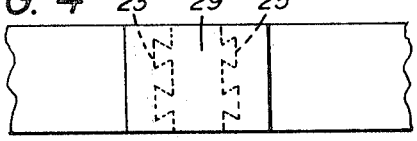
Figure 5:
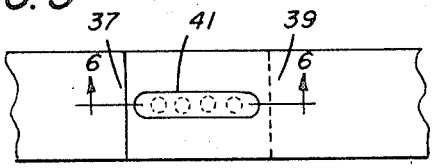
Figure 6:
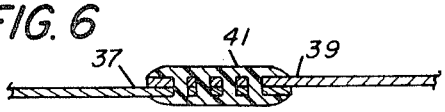
Figure 7:
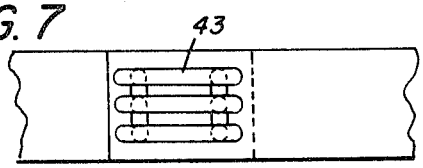
Figure 12:
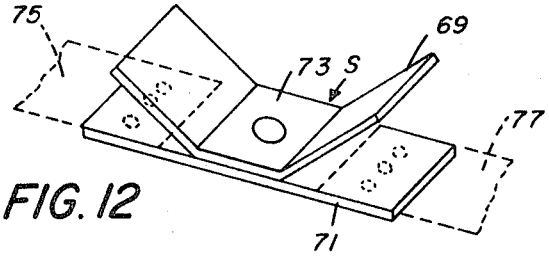
Figure 8:
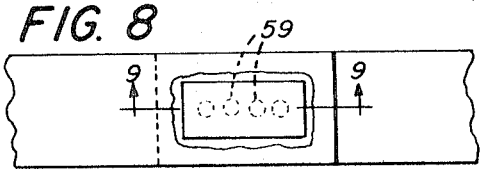
Figure 9:
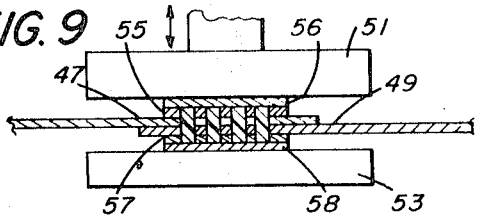
Figure 10:
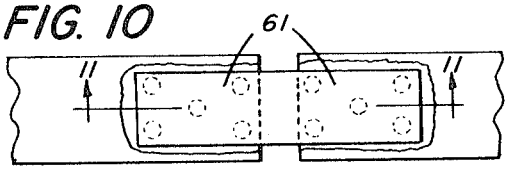
Figure 11:
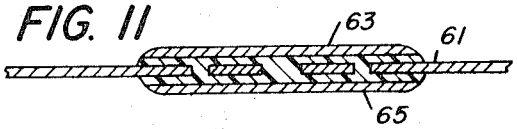
Figure 13:
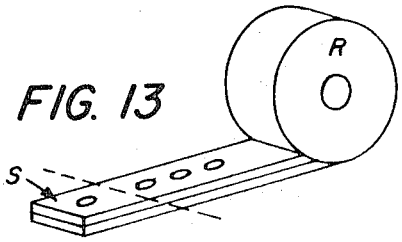

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1367

T889,025
METHOD OF SPLICING WEB MATERIAL, AND SPLICER THEREFOR

Lawrence A. Ulmschneider and Lawrence R. Witherow, both of 1669 Lake Ave., Rochester, N.Y. 14650

Filed Oct. 19, 1970, Ser. No. 81,970
Int. Cl. G03d *15/04*
U.S. Cl. 156—159
1 Sheet Drawing. 10 Pages Specification

Two end portions of web material such as photographic film or paper are spliced together by providing perforations through the end portions, positioning the end portions adjacent one another, placing thermoplastic resin on opposite sides of the end portions, and then causing the thermoplastic resin to flow through the perforations to unite the thermoplastic resin layers. Both butt and lap splicing can be performed in this way. The thermoplastic resin can be injection molded around the end portions, or solid layers of resin can be positioned in contact with the end portions and then heated in situ. The latter technique can be performed with a preformed sealer comprising two layers of resin which are joined between their ends, but are unjoined at their ends, such sealers being readily cut from a roll.

Aug. 31, 1971 L. A. ULMSCHNEIDER ET AL T889,025

METHOD OF SPLICING WEB MATERIAL, AND SPLICER THEREFOR

Filed Oct. 19, 1970

LAWRENCE A. ULMSCHNEIDER
LAWRENCE R. WITHEROW
INVENTORS

BY Walter O. Hodsdon
Henry M. Chapin

ATTORNEYS